(12) United States Patent
Merino Gonzalez et al.

(10) Patent No.: US 11,734,668 B2
(45) Date of Patent: Aug. 22, 2023

(54) SYSTEM AND METHOD FOR A DIGITAL FINANCIAL SYSTEM

(71) Applicants: Jose Luis Merino Gonzalez, London (GB); Jesus Ruiz Gonzalez, Malaga (ES)

(72) Inventors: Jose Luis Merino Gonzalez, London (GB); Jesus Ruiz Gonzalez, Malaga (ES)

( * ) Notice: Subject to any disclaimer, the term of this patent is extended or adjusted under 35 U.S.C. 154(b) by 8 days.

(21) Appl. No.: 16/985,820

(22) Filed: Aug. 5, 2020

(65) Prior Publication Data

US 2021/0090068 A1 Mar. 25, 2021

(30) Foreign Application Priority Data

Sep. 23, 2019 (GB) ..................................... 1913653

(51) Int. Cl.
*G06Q 20/32* (2012.01)
*G06Q 40/02* (2023.01)
*G06Q 20/10* (2012.01)
*G06F 21/73* (2013.01)
*G06F 21/44* (2013.01)

(52) U.S. Cl.
CPC ......... *G06Q 20/3278* (2013.01); *G06F 21/44* (2013.01); *G06F 21/73* (2013.01); *G06Q 20/1085* (2013.01); *G06Q 40/02* (2013.01)

(58) Field of Classification Search
CPC .......... G06Q 20/3278; G06Q 20/1085; G06Q 40/02; G06F 21/44; G06F 21/73
USPC ......................................................... 705/39
See application file for complete search history.

(56) References Cited

U.S. PATENT DOCUMENTS

| 2007/0255662 | A1* | 11/2007 | Tumminaro | G06Q 20/10 705/79 |
| 2016/0196556 | A1 | 7/2016 | Tamboly et al. | |
| 2018/0068293 | A1 | 3/2018 | Dunne | |
| 2018/0232732 | A1 | 8/2018 | Rodrigues et al. | |
| 2018/0330346 | A1* | 11/2018 | Grassadonia | G06Q 20/40 |
| 2019/0149987 | A1* | 5/2019 | Moore | H04W 12/08 726/9 |

FOREIGN PATENT DOCUMENTS

BE 1020531 A3 12/2013

* cited by examiner

*Primary Examiner* — Jessica Lemieux
*Assistant Examiner* — Merritt J Hasbrouck
(74) *Attorney, Agent, or Firm* — Saul Ewing LLP

(57) ABSTRACT

A system and method of operating a digital financial system to extend access to digital banking to those individuals that never had a financial or digital currency account. Users are able to share their internet with other users of the digital banking app of this invention, who are nearby and have no internet connection, to conduct financial transactions by sharing the internet between them. This increases social and financial inclusion to allow unbanked that have a smartphone to have access to the internet and to affordable digital banking. It also improves on the prior art with legal compliance of country of residence verification aided by technology rather than relying solely on information provided by the users. Thereby requesting stricter verification documents to such very small minority of users who are flagged as potentially non-compliant and leave the vast majority alone enjoying their digital banking experience without exhaustive or annoying processes.

9 Claims, 6 Drawing Sheets

SYSTEM AND METHOD FOR A DIGITAL FINANCIAL SYSTEM

CROSS-REFERENCE TO RELATED APPLICATIONS

This application is based on, and claims priority to GB Application No. GB 1913653.0. filed on Sep. 23, 2019, the entire contents of which being fully incorporated herein by reference.

FIELD OF THE INVENTION

A system and method of operating a digital financial system or digital banking system to extend the accessibility to the underserved or underbanked and to automate some compliance aspects through the use of wireless devices adapted as per this invention. Aspects of the disclosures relate in particular to a system and method of enabling a wireless device adapted as per this invention to act as a Mobile Cash Deposit Point "MCDP" where the user of such MCDP accepts cash in hand and instantly transfers the same amount from his own account to the nearby user handed him over such same cash amount in a secure way and consolidated by both.

Other aspects of disclosures consist of enabling those adapted wireless devices as per this invention to perform more secure transaction communications between nearby adapted wireless devices and the system server by splitting a transaction between the number of wireless devices adapted as per this invention that form part of a same transaction. Such associated transactions are recognized by the system server as those containing an identical "Unique Transaction Identifier" (UTID) code. This way a single transaction between "n" parties, requires the server to receive "n" separate requests containing a same UTID. Each of those transaction is sent without any user information from such adapted wireless devices to the system server, where the system executes all such associated transactions between each named account. In this way the transactions execution is always between identified system server users' accounts (meaning never anonymous) yet the transaction petitions between all the adapted wireless devices of an associated transaction and the system server adapted as per this invention, are performed anonymous, thus protecting user data.

BACKGROUND OF THE INVENTION

Traditional high-street banks are evolving to the online digital era. The internet and regulation helped create the right framework for challenger banks to operate as a non-branches' banks business providing online or digital banking facilities directly only services to end-users.

The financial services provided between traditional and challenger banks have become less on the products offered and more in the way they interface with end-users and the ease of creating an account. For example opening a bank account in a high-street bank could take days and lots of paper work, and lately these traditional high street banks have moved on to have also their smartphone apps where opening an account can be done in 10 to 20 min, with still a lotta questions and answers required and an identity check still too complex: in some cases it requires to go with a passport or national ID card or driver license to a local bank branch or have a lawyer or a post office authenticate a copy of the original.

Challenger banks on the other hand perform the identity checks, mostly internal or through specialized "KYC" (know your customer) companies that verify online ID document in semi real time and the same for address verification a simple photo with the smartphone in-app uploading the document is sufficient as address verification, which is well received by end-users and attracted millions of end-users to sign-up with challenger banks.

The more user-friendly user interface of the apps of challenger banks and other financial or banking re-sellers or financial service providers has made it more appealing for end-users who had a traditional high street bank account to also open one with challenger banks or in some cases even drop their traditional high street bank and move all together to the new incumbents like challenger banks and other financial or banking re-sellers or financial service providers.

When adding the fact that regulation has become a lot clearer in recent years and in particular in Europe the allowance of passporting (transferring the right of use to all of Europe) a financial license, e-money license or banking license obtained in one European territory country to be accepted to operate in all the countries of the whole of the European region, known as the EEA area (European Economic Area). These licenses have become affordable to start-ups and other businesses wishing to experiment into a new sector, thus with a lower entry ticket allowing new ideas to be tested and exploited as start-ups competing with long time established financial institutions at a mass scale.

Despite the amazing improvements in digital banking services and a wide variety of competing companies to choose from by end-users, there are still certain shortcomings that need to be improved or overcome:

One such shortcoming is the fact that all the prior art requires a new user to activate his new account by depositing money into his newly created account;

in the case of a traditional high-street bank by handing over some cash in person in a branch office or to have a family member transfer some money from his account to the newly created account from his bank app on his smartphone or transfer with his credit or debit card.

in the case of a challenger bank or such other financial re-seller only having the option of a family member transferring some money from his account to the newly created account from his bank app on his smartphone or transfer with his credit or debit card.

Unfortunately, this works between family members where one already had a bank account or a digital money account but it doesn't work for an unbanked family where none of the members have a bank account nor a digital money account. The prior art can't serve those individuals who are not accepted by traditional high street banks for a variety of regions, such has too steep account opening costs or minimum deposit requirement on account and so forth. As an illustration of this, according to a newspaper of the United Kingdom, there are in 2019 still 1.5 million individuals in the United Kingdom with no bank account at all. That on a population of just over 60 million is a staggering ratio for a so-called developed country. On the other side for the scale, in a developing country like Mexico, according to a major United States investment bank, there are in 2019 around 42 million people with no bank account in Mexico.

This phenomena of underserved or unbanked people requires a technical solution as well as a social will from companies prepared to have a business that inspires to be profitable but with a positive social impact.

Another shortcoming relies to compliance with regulations where certain countries have a legal obligation to exchange information with other countries related to deposits and transactions of their citizens. In this respect the country of residence and in other cases the country of fiscal residence becomes the trigger for such exchange. Traditional banks used to and still today resolve this by sending a letter to the address provided by the account holder with some kind of action required by the account holder such that the address is confirmed by such action, and in other cases the mailing of a credit or debit card to the account address as the way to confirm the address of such account holder. Challenger banks rely on the utility bill in some cases or on the mailing address of a credit or debit card to the account address as the way to confirm the address of such account holder.

Although these methods are perfectly workable and do not provoke any major difference between traditional and challenger banks, means that users ae unlikely to switch from one to the other for any difference on address verification that would be easier in one of them. This however does not resolve the fact that some users do use address of someone else, like a friend or a family member in one country whilst that user actually resides in a different country. That means that the country where the user truly resides, or where he is truly tax resident is obfuscated and can't be verified for compliance reasons with above methods. Traditional banks tend to additionally require the account holder to provide his TAX Identification Code of the country where he is tax resident but again that is not a full proof method and needs to be improved or resolved by compliance aided by technology.

Our invention resolves all the prior art shortcomings because our innovative SYSTEM AND METHOD FOR A DIGITAL BANKING SYSTEM allows for a friendly way by the use of technology for;

those underserved or unbanked users who never had a bank account or a young user' first ever bank account or digital account to open a first ever or a new digital account and deposit digital money in exchange for cash (be it restricted in amounts in compliance with local regulations for money laundering or due to legal maximum cash deposit limits).

all bank account users or digital account users that use an App of their traditional bank, challenger bank, financial service provider or digital banking re-seller to be monitored the country where their smartphone with that App is each day on a rolling basis, in line with local regulations such as some countries consider a person fiscal resident if they stay more than 90 days in that country yet most countries consider more than 182 days as the threshold.

BRIEF SUMMARY OF THE INVENTION

The present invention is designed to overcome the shortcomings of the prior art and to provide an automated way of resolving the shortcomings of the prior art specifically for Internet enabled wireless devices capable of downloading a software module, also referred herein as an App or Application, from the Internet. Such software module when downloaded onto the Internet enabled wireless device renders the software module operable to communicate with other wireless devices with the same such software module downloaded on to such other wireless device nearby. The invention requires for resolving one of the shortcomings, the wireless devices to have in its hardware the accessibility to a short-range transceiver such as for example "NFC" (near field communications) and/or Bluetooth 5.0 and/or "BLE"/ Bluetooth low energy) or any such other current or future low power—short range transceivers. NFC typical range is between 1 and 10 cm, whilst for example Bluetooth or BLE range is between 1 and 10 meters indoor and 1 to 50 meters outdoor as a rule of thumb and depending on the obstacles between sender and receiver. These last can be reduced in range by reducing or limiting its output transmit power to a much shorter range which is the preferred option in this invention to reduce the possibility of ears-dropping or known as others listening in by nearby receivers and thereby reducing the possibility of hacking even further.

To resolve another prior art as to the country of residence verification it requires multiple ways of verification without annoying the users as most are honest and thus there is no reason to annoy or disturb the vast majority and only those very small minority that are not compliant or those which our system or method detects as potentially having provided mistaken or false address/country information will be contacted to provide additional information, such as a certified legalized copy of their tax return or a letter from his country of residency or tax residency official government confirming his residence or tax residence status.

The wireless devices herein are those smartphones, tablets and any such other devices that incorporate mobile and wireless technologies like for example some of these or a multiple of these wireless technologies, but not limited to: 3G, LTE, 4G, 5G, PCS, CDMA, W-CDMA, NFC, WIFI, WIFI-Direct, Bluetooth, BLE, GPS (US based global location), GNSS (European based global location) and other such current or future wireless technologies.

There is provided a system and method of operating a digital financial system to extend access to digital banking to those individuals that never had a traditional bank account nor a challenger bank account nor any such other financial or digital currency account. Users of the same digital banking app of this invention will be able to share their internet with other user of the digital banking app of this invention who are nearby and have no internet to conduct financial transactions by sharing the internet between users of the same app herein. These innovations are expected to contribute positively to social and financial inclusion allow unbanked that have a smartphone to have access to the internet and to affordable digital banking.

This invention may also improve on the prior art with legal compliance of country of residence verification aided by technology rather than relying solely on information provided by the users. Thereby requesting stricter verification documents to such very small minority of users who are flagged as potentially non-compliant and leave the vast majority alone enjoying their digital banking experience without exhaustive or in some cases annoying processes.

Figure 1:
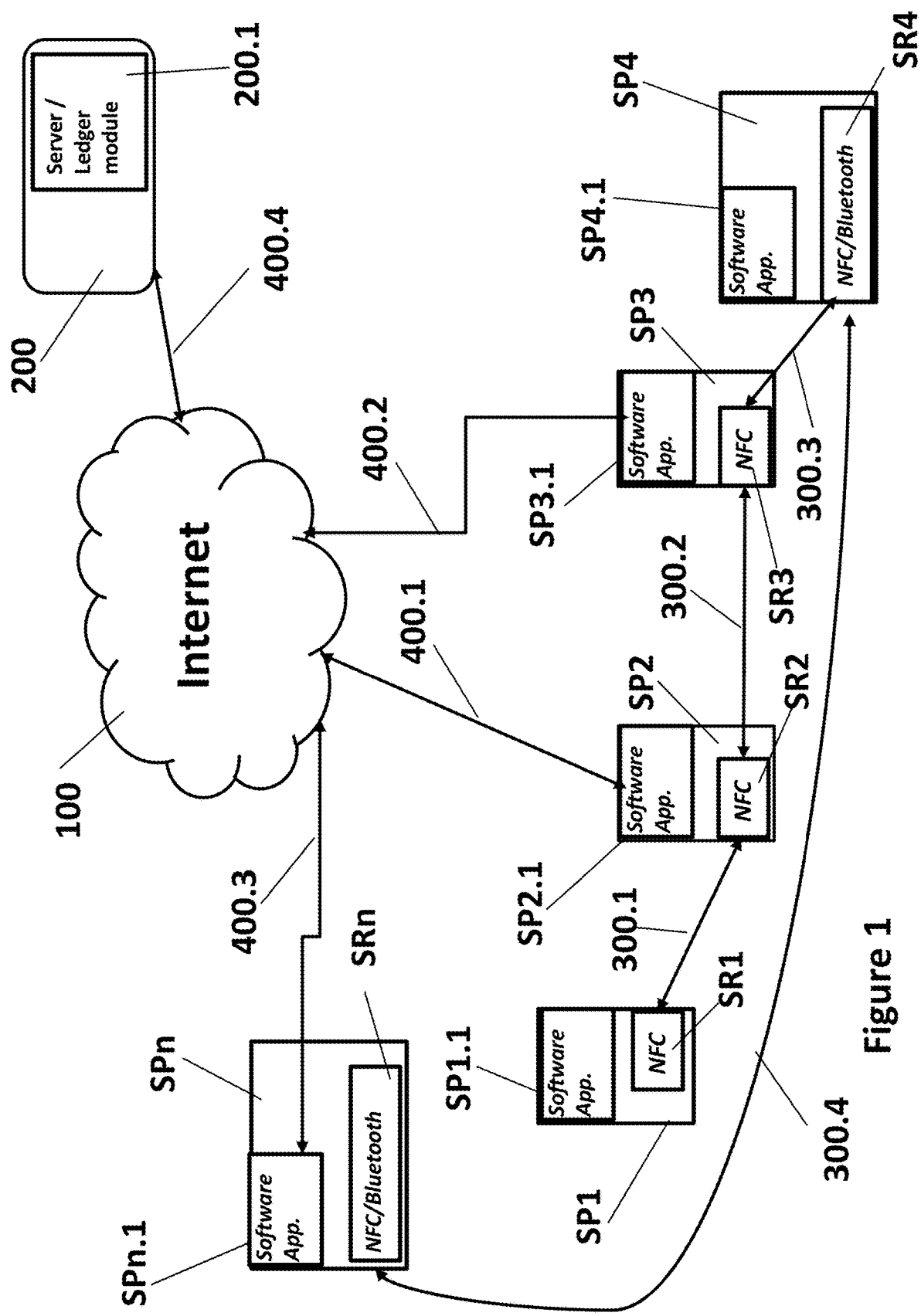
FIG. 1 represents a typical embodiment of the present invention system, applicable amongst others but not limited to a wireless digital financial system, or a wireless digital financial system or a wireless digital banking system.

The system of FIG. 1 comprising of at least one or more Servers and/or Ledgers (200) with a proprietary software module (200.1) to enable communications through the internet (100) with the wireless devices, also known as smartphones or tablets, (SP1, SP2, Sp3, SP4, . . . , SPn) with a proprietary software application (SP1.1, SP2.1, SP3.1, SP4.1, . . . , SPn.1) downloaded into each respective wireless device.

Each wireless device is enabled to access the internet through different methods, such as through mobile network data (4G, 5G, WCDMA, etc. . . . ) or through fixed network data with wireless access (WIFI, Bluetooth, WiMAX, etc. . . . ), shown in FIG. 1 as (400.1, 400.2, 400.3).

All wireless devices and the system server (200) and Ledger (200.1) communicate with each other through internet communications channels (400.1, 400.2, 400.3).

Each wireless device is additionally enabled to communicate wirelessly with each other through short range radio (SRL SR2, SR3, SR4, . . . , SRn) 2-way radio transceivers, such as for distances up to 10 cm through NFC (near field communications) (SRL SR2, SR3, SR4, . . . , SRn), whereas for distance of >10 cm such as the distance of people around a same table to cover a meter or max several meters by the Software application or also known as "app" (SP1.1, SP2.1, SP3.1, SP4.1, . . . , SPn.1) reducing the output power of a separate and additional radio additional to the one used for communicating with the internet, such as a second WIFI transceiver or an additional Bluetooth or Bluetooth 5.0 or BLE (Bluetooth low energy) transceiver (SR4, SRn).

A transaction initiated by a user of a wireless device is done by the user first logging into his "app" (SP1.1, SP2.1, SP3.1, SP4.1, . . . , SPn.1) then entering selecting the type of transaction, i.e. deposit/withdraw cash from nearby user, make a foreign exchange between him and a nearby user, split a payment with one or more nearby users, pay or make a transfer to a nearby user, make a payment or transfer to a user not nearby.

Where in the prior art a 2FA/two factor verification) is performed additionally to the login, like an SMS or Notification or Email code that system sends to the user to confirm a transaction BUT in this invention, 2FA may be performed by the system itself in this way:

Let's take as an example a payment by transfer between two users of (SP3) and (SP2). Once the user of (SP3) logs-in at (SP1.1) and selects transaction type "payment by transfer" and enters the amount X and the currency Y to pay/transfer/Debited AND then the "app" (SP3,1) or the system server module (200.1) generates a Unique Transaction Identifier (UTID) whilst the user of (SP3) brings his wireless device (SP3) back to back within a distance closer than 10 cm from user of wireless device (SP2) who will see a local notification generated by "app" (SP2.1) pop-up with the amount and currency he will receive/credited. User of (SP2) then will have to log-into his "app" (SP2.2) to confirm the transaction.

The 2FA (two factor authentication) is in an example of our invention performed by a user logging into his own "app" as first authentication and by the manual task with his own personal wireless device bringing it back to back to the other wireless device, as close as <10 cm from each other or basically touching each other, of the other party in the transaction as a second verification and let's not forget the (UTID) exchanged by (NFC) between the "app" (SP3.1 and SP2.1) of both wireless devices (SP3 and SP2) is the third authentication verification.

Such parameters of each "app" (SP3.1) and (SP2.1), will be sent as two separate and independent transaction to the system server/Ledger (200 and 200.1) to be processed by the server/Ledger (200 and 200.1) as follows;

The server will receive first one of the two transaction requests, say it receives the one of (SP2.1) first and extracts, amount X, currency Y, to be Credited to him, number of parties to this transaction as 2, and the UTID. The system server/Ledger (200.1) will not execute it as it requires in this particular example 2 parties and only received it from one so far, then when the server/Ledger (200.1) receives the transaction request from (SP3.1) it extracts amount X, currency Y, to be debited to him, number of parties to this transaction as 2, and the UTID. Since both UTID codes are identical and the transaction request is now complete from the number of parties (2) to that transaction it executes and Debits account of the user of (SP3 with app SP3.1) and Credits the account of the user of (SP2 with app SP2.1).

Other methods of transactions can be performed as above but instead by user's wireless devices (SPn) and (SP4) being >10 cm apart, like say a meter or a few meters, whereby instead of the "apps" (SPn.1 and SP4.1) communicating through Bluetooth (SRn and SR4) with the output power of each Bluetooth limited by the corresponding "app" (SPn.1 and SP4.1) to not exceed a radio range of a meter or max a few meters. In this case communicating through NFC is not possible as the radio range is maximum up to 10 cm and thus communications is done through Bluetooth (Bluetooth 5.1., BLE or other)

A different method protected by this invention allows for when one or all parties who at the moment of the transaction that have no connection (400.1, 400.2, 400.3) to the internet (100) like for example wireless device (SP1) with "app" (SP1.1) and wireless device (SP4) and "app" (SP4.1), that form part of a same transaction, meaning with same (UTID), to complete the transaction between the "app" (SP1.1, SP2.1, SP3.1, SP4.1, . . . , SPn.1) of each other's smartphones (SP1, SP2, Sp3, SP4, . . . , SPn) through their low range low power transceivers (SR1, SR2, SR3, SR4, SRn). Then each corresponding "app" of the wireless devices that had no internet (SPn.1 and SP4.1) to transfer their transaction parameters to the system/Server (200 and 200.1) in one of these two methods:

By a nearby wireless device "app" (SPn.1, SP2.1 or SP3.1) to share the internet of one of the nearby wireless devices (SPn, SP2 or SP3) by activating, if available on such wireless device, an additional transceiver (WIFI, Bluetooth, or other similar), which is an additional one different than the one used to get internet itself, and share an additional parameter through the low power connection (SR1, SR2, SR3, SR4, SRn) namely the password of such internet sharing WIFI or Bluetooth, or If the previous is not possible due to unavailable extra transceiver or such internet sharing failed for whatever reason then the "app" (SP1.1 and SP4.1) if the wireless devices (SP1 and SP4) will transfer at the next first internet connection their respective transaction parameters to the server/Ledger (200 and 200.1) even if its hours or days later.

This is particularly beneficial for regions with low mobile or wireless internet penetration as to allow such users still to have access to Digital banking.

Figure 2:
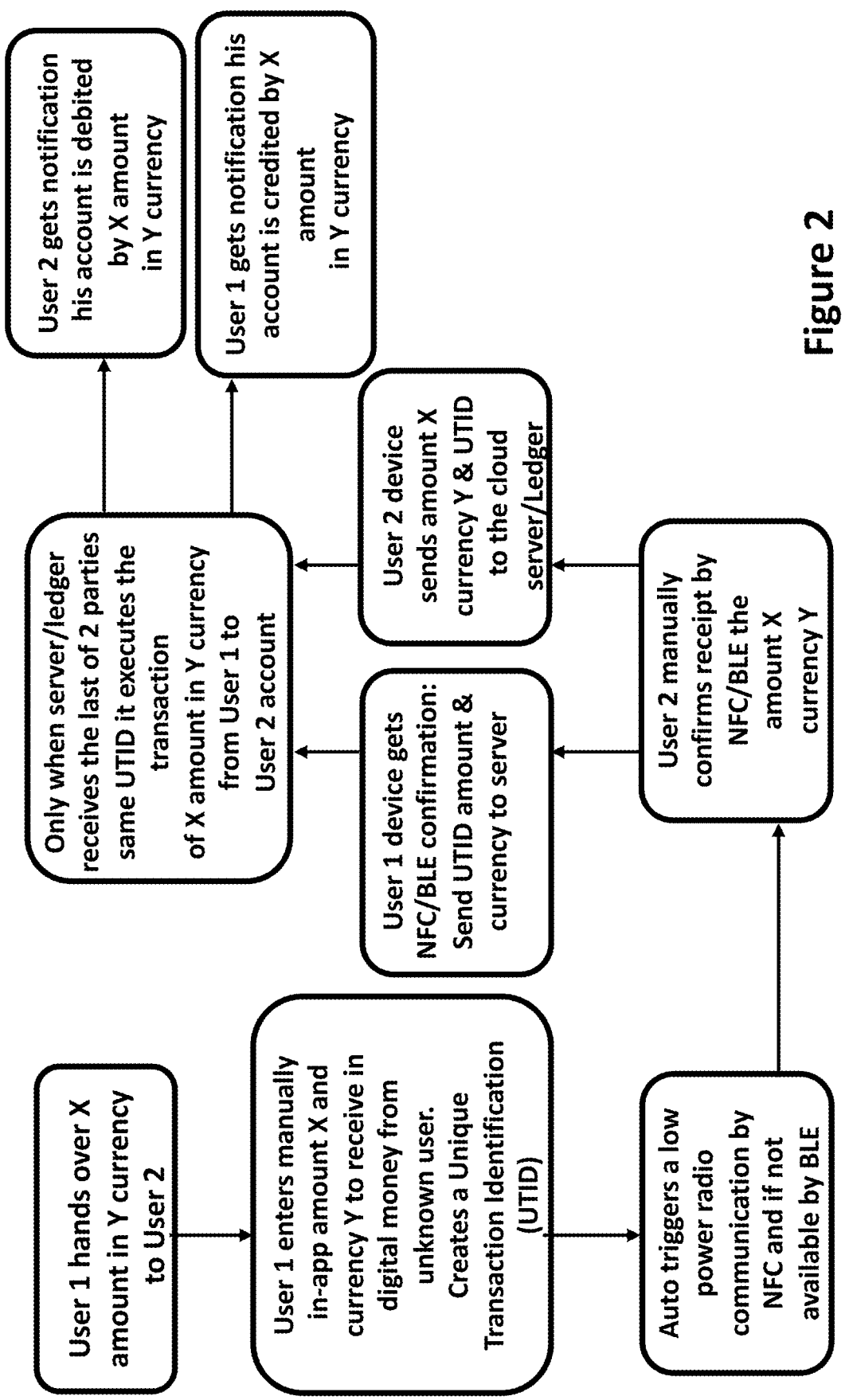

FIG. 2 represents a flowchart of a typical embodiment of the present invention, in a wireless digital financial system, or a wireless digital financial system or a wireless digital banking system.

Figure 3:
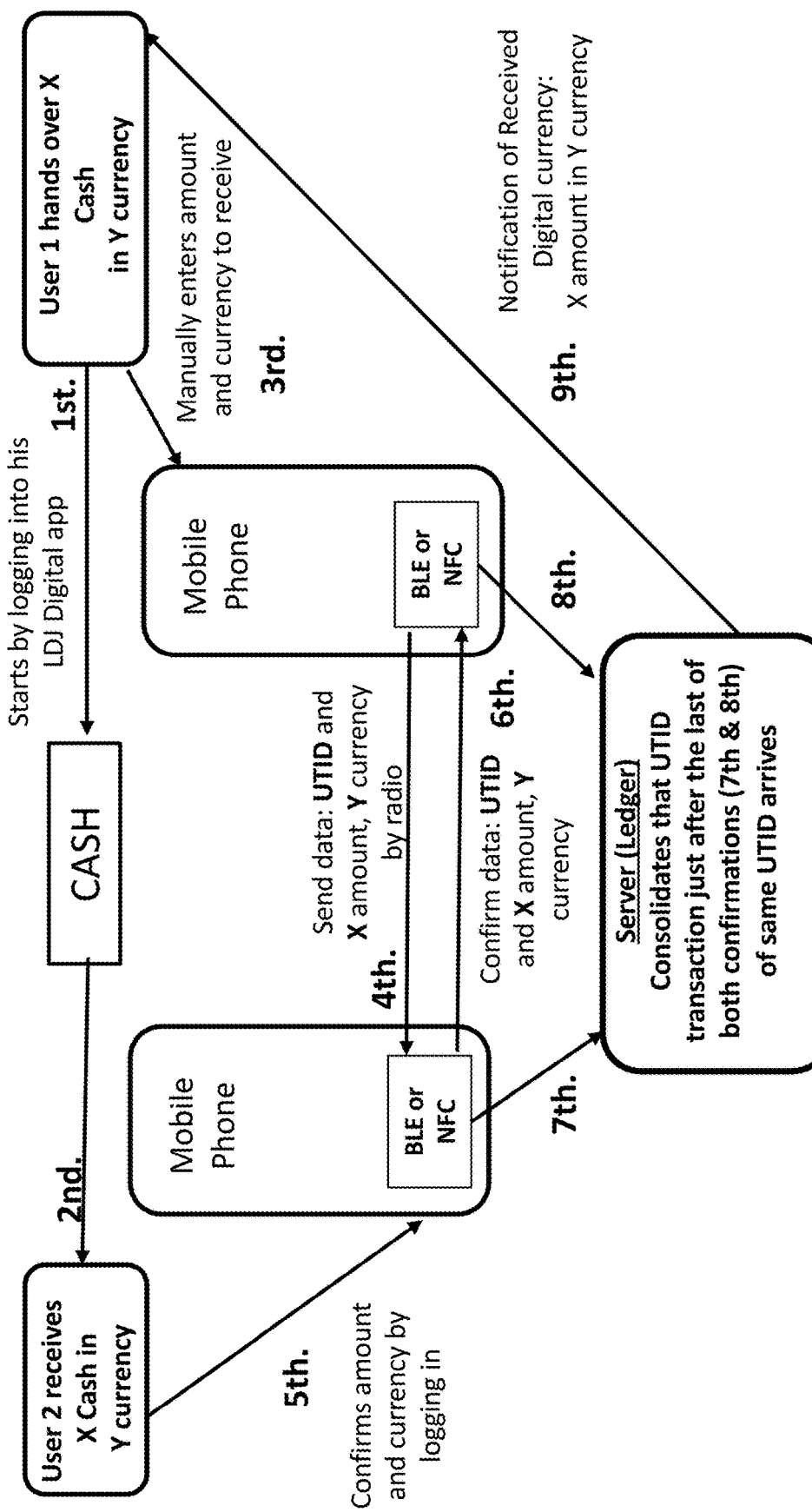

FIG. 3 represents a cash deposit embodiment of the present invention, in a wireless digital financial system, or a wireless digital financial system or a wireless digital banking system, between two different users of the system of this invention conducting the transaction between their respective wireless devices (Smartphones, tablets).

Figure 4:
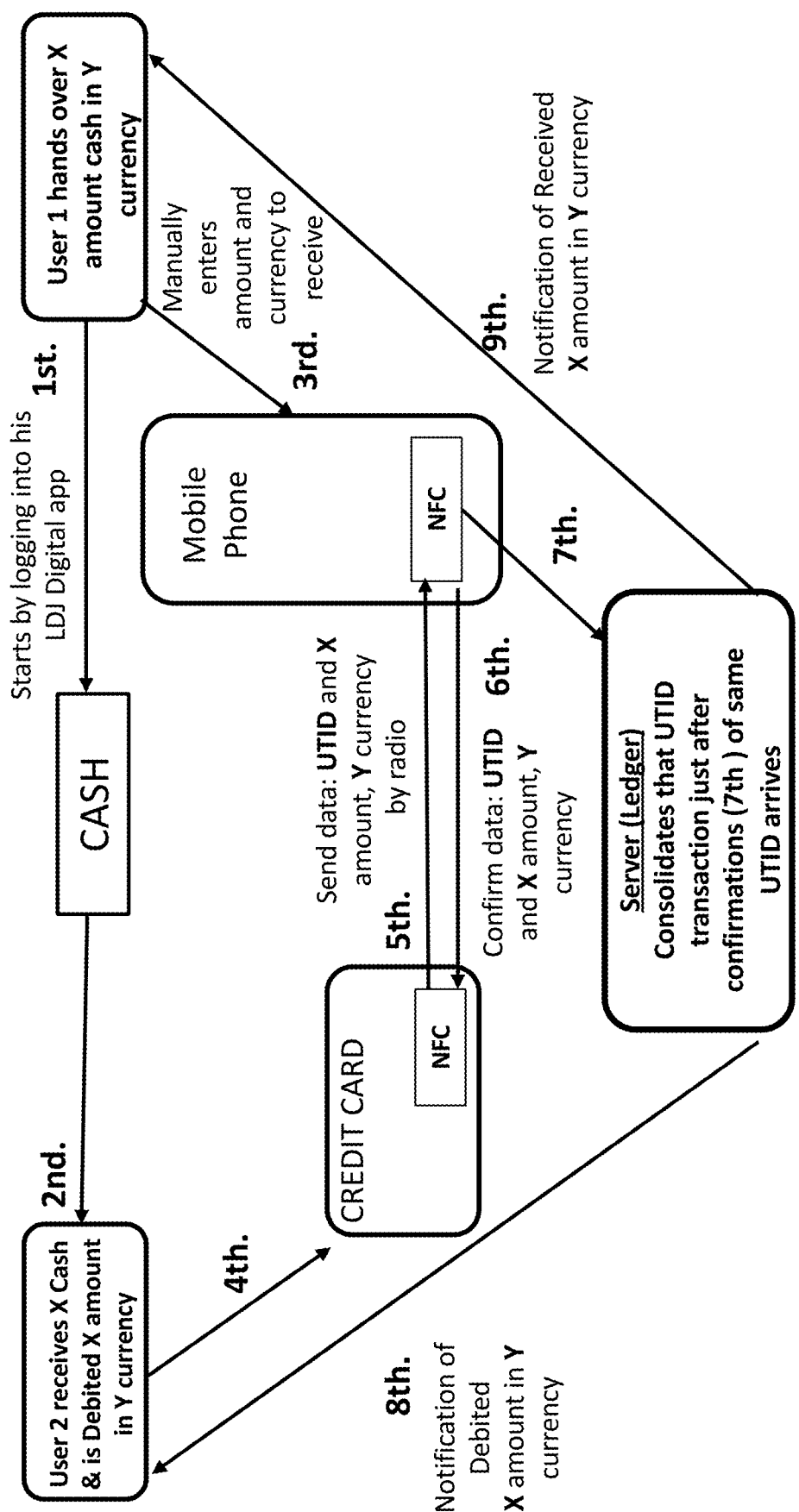

FIG. 4 represents a cash deposit embodiment of the present invention, in a wireless digital financial system, or a wireless digital financial system or a wireless digital banking system, between two different users of the system of this invention conducting the transaction between the Debit or Credit card of user and the respective wireless devices (Smartphones, tablets) of the other user.

Figure 5:
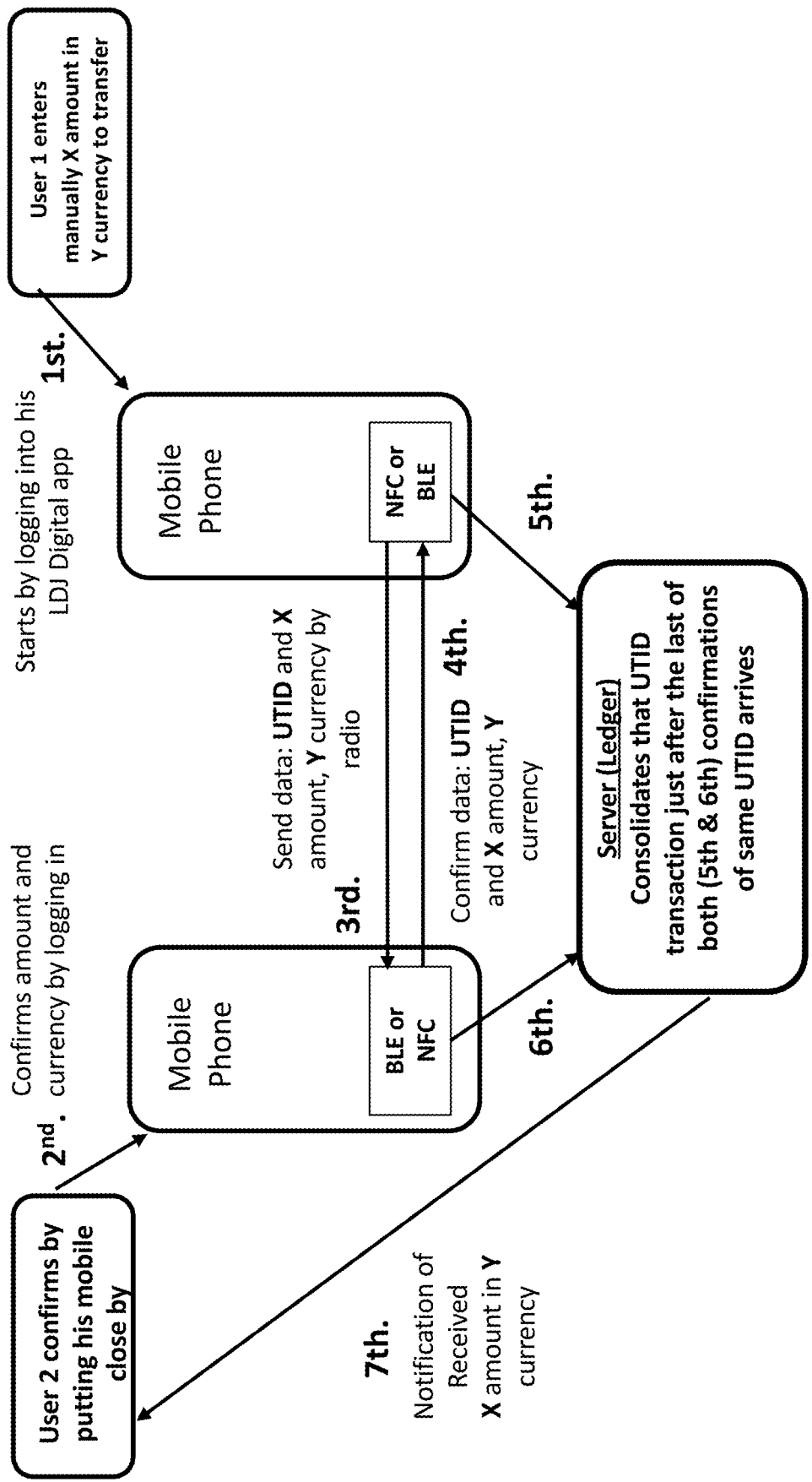

FIG. 5 represents a payment transfer embodiment of the present invention, in a wireless digital financial system, or a wireless digital financial system or a wireless digital banking system, between two different users of the system of this invention conducting the transaction between their respective wireless devices (Smartphones, tablets).

Figure 6:
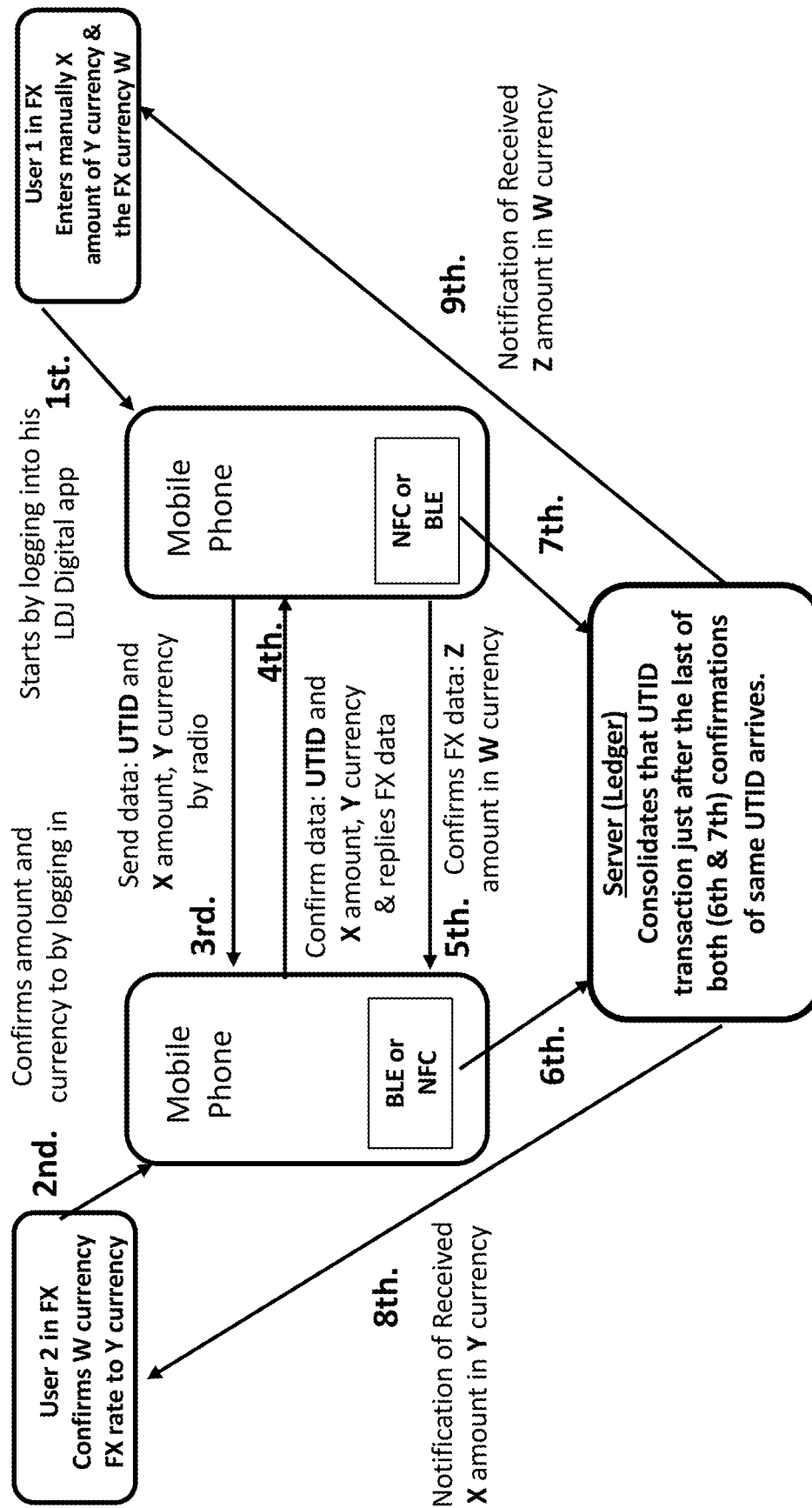

FIG. 6 represents a foreign exchange (FX) embodiment of the present invention, in a wireless digital financial system, or a wireless digital financial system or a wireless digital banking system, between two different users of the system of this invention conducting the transaction between their respective wireless devices (Smartphones, tablets).

DETAILED DESCRIPTION OF THE INVENTION

Specifically, FIG. 1 is a top-level block diagram of a typical implementation of the present invention. In essence when a person (user 1) never had any traditional bank account nor any digital challenger account at all but has a smartphone or tablet with occasional access to internet, yet not necessary to have internet at the moment of the transaction itself and with a low power transceiver for short range (NFC up to 10 cm range, BLE 10 cm to >10 meters).

When user 1 has the same digital banking app of this invention as a nearby user 2, and wherein:
  user 1 has an amount X in currency Y, and has a digital banking app account same as that of user 2, but user 1 has no digital funds as he never had an account before
  user 2 has a digital banking app account of this invention, same as that of user 1, with sufficient funds in the currency that user 1 wants.

Then user 1 enters in his digital banking app the amount X and currency Y which he wants credited (owed/receive) and which he is handing over in cash to user 2, and then both user 1 and user 2 slap their smartphones together back to back till they perceive a feedback of transaction by the low power transceiver NFC or if a meter or more apart by BLE, and exchanges the X and Y parameters and a Unique Transaction Identifier (UTID) and sends that to user 2.
  User 2 on screen then confirms amount X in currency Y to be debited from his account as he received that amount in cash in hand, and
  then the digital banking app of both users will automatically send separately to the cloud/server/ledger whenever next first opportunity that his has a connection with the internet, sending the parameters "X amount", "Y currency" and "UTID" and in the case of users 1 adds parameter "credit" whilst in the case of user 2 parameter "debit".
  User 2 and user 1 can be two persons who do not know each other and thus the digital banking app of this invention makes that transaction between two unknown persons or users.

The cloud/server/ledger to which the digital banking app of this invention is associated to then will not execute the actual transaction when it receives only one of the two transactions requests. For example, if user 2 send the anonymous transaction request to be debited by amount x in currency y with an associated UTID then the server/ledger will not execute it until it receives a second transaction request within a limited time in the future (say for example a week later) with the exact same UTID and the exact same amount x and currency Y requesting to be credited (owed/received) from an unknown user (debtor). Only then will the server/ledger execute and record the actual transaction to credit user 1 and debit user 2 with amount x in currency Y.

This method and system in effect converts users of the same digital banking app of this invention into potential "mobile points of deposit" (MPOT or MPOTS). Any user with sufficient digital money (EURO, GBP, USD, etc.) or crypto currency (Bitcoin, Bitcoin Cash, etc.) equal or more then the cash amount (EURO, GBP, USD, etc.) another user wants to exchange (FX) in the same currency or another currency at an exchange rate (FX) as provided by app in semi real time from the Cloud/server/Ledger is in effect a MPOT. This means that our system and method can potentially turn millions of users a same digital banking app of this invention into ATMs but instead of an ATM machine it is a smartphone that acts as an ATM between two or more individual users.

In one embodiment this invention digital banking app uses the location of the wireless device (GPS, GNSS or other) shown on a map of the users that have funds and indicated in their own app that they are willing to act as a MPOT to accept cash from other users of the same digital banking app network. This in effect is expected to contribute to financial inclusion to allow users that never had a bank account to become digital banking users and deposit their cash (be it limited by the network in amount of cash in line with local regulations) with another user and instantly or when he has internet next to receive it in digital money in the currency he agreed with the other user.

The same as above method or process flow is applicable when user 1 and user 2 both have an account with sufficient digital funds on account, be those traditional money in digital form or the more recently known as crypto currency also in digital form. In this scenario user 1 can enter in his digital banking app the amount x in currency Y that he wishes to transfer to user 2 and if both have internet then each user device sends the parameters together with a UTID to the cloud/server/ledger who executes instantly the transactions. Both users would receive a notification of that amount x in currency having been debited or funds reduced (user 1) or credited or funds added (user 2).

In a different embodiment, in the event that say user 1 uses a credit or debit card to send money to user 2 without user 1 needing to use his smartphone at all, then user 2 enters the amount X in currency Y and shows it on screen to user 1 who then puts his credit or debit card to the back of the smartphone of user 2 to communicate with NFC. User 2, then gets a feedback that credit or debit card transaction is confirmed and then user 2 will send a UTID (Unique Transaction Identifier) with the amount x in currency Y to be credited to him, whilst the credit or debit card transaction will be sent through user 2 internet connectivity to the cloud/server/ledger to be executed by the credit or debit card provider. In this case the server/ledger will not execute this UTID transaction as it will never receive another one from the unknown user 1, but in this case it's the credit or debit card service provider who execute the transaction to send the amount x in currency y to user 2 account.

In yet another different embodiment an additional parameter "number of same UTID" required to execute the transaction. For example, when a transaction is only between user 1 and user 2 then that parameter would be set to "2" but in the scenario where user 1 pays the whole bill in a restaurant or any such other place and wishes to split the bill between 4 people, with himself and 3 other unknown users 2 to 4. Then that parameter "number of same UTID required" would be set by the digital banking app of user 1 automatically to "2" when confirmed by tapping the smartphones of user 1 and user 2 together, and set to "3" when tapping the smartphone of user 1 to user 3, and set to "4" when tapping the smartphone of user 1 to user 4 and so forth, to "n".

In another embodiment, when a transaction between 2 or more nearby users, one at least has internet then if any of the others that are involved in the transaction has no internet, then the digital banking app of the smartphone of the user that has internet will share his internet with the other(s) digital banking app smartphone(s) of this invention. This internet sharing is expected to contribute to both social and financial inclusion, mainly because when a user is given access to digital online banking it will be more likely that we will be able to pay for internet in the future and the fact that other digital banking app users of this invention might share their internet only with other digital banking user of this invention if they are nearby will contribute to an increase in internet connectivity and thus access to information and education online and thus aid social inclusion.

It is to be noted that every single transaction a UTID is unique and never repeatable in any future day and is created by the first initiating wireless device or smartphone of the user with a digital banking app of this invention. This UTID will be shared only by short range radio (NFC till 10 cm or BLR/Bluetooth 5 reducing output power to reduce range to a meter or so) with each party in the anonymous transaction, which can be 1 person in the case the other uses a credit or debit card, more commonly its shared between 2 people or between more than 2 when splitting bills in a group of people. It is to be noted that the UTID has no relationship with the server/ledger/correspondence bank transaction number which is created typically in existing infrastructures sequentially to keep records of all transactions for a period as defined by applicable law. In the event a transaction of this invention is done for example between 4 anonymous persons, the infrastructure will record 4 different transactions and 4 different transaction numbers, one for each user as typically the law requires to keep records of all transactions per user account.

In a different embodiment the UTID can be auto generated by the digital banking app to the server/ledger to auto generate it and provide it to the initiating party providing it has internet or by the digital banking app if its set to auto generate each UTID when initiating a transaction.

In the event the initiating digital banking app has no internet then the initiating digital banking app will auto generate a UTID.

The UTID may be generated randomly but may also use in a different embodiment, parameters that are unique to that user to create a code when performing a coding to it. For example, a UTID (Unique Transaction Identifier) could be for example formed by the following characters:

"day/month/min/sec/email/RandomCharactersOfXlength"= mister@gmail.com/15/9/20/59/abcde?12345! Or

"day/month/min/sec/MobilePhone/RandomCharactersOfXlength"=15/9/20/59/123456789/abcde?12345!

Then this would be coded to provide a random code where the email address is not recognizable.

In this case that same code is impossible to be generated by any other user as the email or phone number are confirmed by such user created an account in the digital banking app of this invention.

Also for the same user a same code as the one just generated is impossible to be created within 1 year because the month is used and is not repeated until a year later, but even if a user would change manually the day and month then still it is virtually impossible to create the same code in the next millions of generated codes due to the random characters at the end that are auto added which allow for an incredibly high number of possibilities increasing in proportion to the number of the added random characters at the end of the UTID as shown in previous examples. Since the transaction will have a time out set at the place where they are to be executed (server/Ledger/correspondence bank) even if the codes would never return within a year it would be sufficient but with above examples the statistical probability of a same code to be generated is a magnitude higher than a year per user generated UTID. As for the case when the server generates the UTID it will not be different as a user requests a code to be generated whereby the server can then use more parameters that are unique to the requesting user, like adding to the UTID string, the users 'birthday (dd/mm/yyyy), and/or post code, and or house number and/or part of his account number, and/or any such other unique information to that user requesting a UTID, making the UTID a lot more unlikely, then the one generated by the smartphone, to be generated with the same string again for a very long time in the future.

In yet another different embodiment the digital banking app extracts information that gives indication of the country where the wireless device (smartphone or tablet) is on a daily basis. This extracted information is as per user consent when installing the app or alternatively when each such function is firstly used by the digital banking app of this invention, such as but not limited to once a day at the first opportunity each separate parameter is available:

If the digital banking app of this invention downloaded in a wireless device (smartphone, tablet or other) detects a SIM (subscriber identification module) then it extracts the SIM country code (not the phone number as that is irrelevant to the indication of the country)

If the digital banking app of this invention downloaded in a wireless device (smartphone, tablet or other) detects the operating system allows access to a roaming indication then it extracts such Roaming indication.

If the digital banking app of this invention downloaded in a wireless device (smartphone, tablet or other) detects the location hardware is accessible, such as GPS (US based global location), and/or GNSS (European based global location), then it extracts the coordinates strictly and only to obtain with a look up method the country of the current location and not the actual precise location.

If the digital banking app of this invention downloaded in a wireless device (smartphone, tablet or other) is connected to the internet but not through a mobile SIM network, for example through WIFI connected to the fixed internet network or other equivalent ones (WiMAX, Bluetooth, WIFI, etc.) then it extract the country by sending a http or https ping to a global service provider who has local servers to reduce latency to its own users, whereby when a ping is send to such 3rd party global service provide main internet domain it will respond with a redirect to its local in-country server and typically in the redirect link received in response to our request the country code can be extracted from that.

It is to be noted that the extracted country per day may be obtained in some days by none of the above methods or processes, in some case due to the fact that there is no SIM present or in other case due to the fact that the user sets his phone in flight mode or the user disabled the location features to safe battery on his phone.

Therefore, the method and system used to determine which country truly the user is in any single day, is performed statistically:

If the internet connection is to a mobile network (through the SIM) then the http or https ping is not performed because every mobile network is in effect a VPN (virtual private network) and the country of an https response of such $3^{rd}$ party would always be the home country of the SIM (=country code of the SIM) regardless in which other country in the world the users' smartphone truly is.

However, if connected to a mobile network internet then the Roaming Indication if available is the one stored for that day. Since in some case when users are close the physical borders of nearby countries then it is possible that a smartphone user is in one country but in reality, he is physically in the neighboring country. So, if the location country (GPS) then the physical location will prevail over the Roaming Indication.

Only if the physical location (GPS) is not available then the country code of the http/https ping response is used as a WIFI range is very low (tenths of meters) known by the skilled in the art the IP address country, but if this last is also not available then the indication of Roaming or not is stored as not being in the home country.

The info is sent on a regular non-real time basis (for example once a week or so) to the server/Ledger who then stores and counts the number of days a user is not in the country he provided in his account creation process. This is verified on a rolling basis depending of applicable law on a rolling 91 days basis or rolling 183 days basis and on a rolling 365 days basis.

If a user is deemed statistically to have been equal or more than 92 or 183 days respectively in a given period than outside of his country provided on account, then depending on applicable law a message is sent to such user(s) only that exceed that threshold requesting to provide further proof of address or proof of residency or proof of fiscal residency and if necessary to correct his address and country in his user account or if such user does not respond satisfactory in a reasonable time to block such account till satisfied info is provided or shut such account and request the user to where to send such funds prior to closure. In some cases depending on applicable law and depending on if any suspected unlawful activity is suspected when detecting such inconsistency between the country the user provided and the trigger detection when our method and process suspects that user is not truly living or residing in the country he provide and suspecting potential false provided information then authorities might need to be informed, unless the user respond with satisfactory documentation of course, in which case that use is marked as verified by stricter documentation than usual. Meaning instead of the usual utility bill a local Government Issue document confirming his address of residency or a copy of the first page of his tax return showing his name and address.

In another embodiment the initiator of a transaction when the radio range is extremely short, like 10 com with NFC, can be performed by any of the user(s) involved in the transaction but when the radio range is more than 10 cm like for example in the case of using Bluetooth 5.0 or BLE or other such transceivers be it reducing its output power (to a meter or so), in that case the initiator of a transaction is always the user who is owed, who needs to receive in that transaction or in other words by the user that needs to be credited a certain amount in a given currency.

In a different embodiment the digital banking "software application" (app) function of this invention can be imbedded inside static devices, such as for example but not limited to: a payment terminal or also known as a point of sale terminal that process typically credit and debit card payments to interact with smartphones with a digital banking app of this invention, a retail cash-register machine to interact with smartphones with a digital banking app of this invention, a vending machine to interact with smartphones with a digital banking app of this invention, vending machine that accept cash payments to be used as cash deposit and/or cash withdrawals machines when interact with smartphones with a digital banking app of this invention thus virtually using such adapted vending machine as an ATM (automated teller machine).

In a different embodiment the wireless digital financial system banking or a specific market segment, the digital banking system, uses a trust scoring wherein users themselves that are a party to some specific transaction are enabled to so score the other party, such as for example in a cash deposit transaction each of the two parties will be enabled to score the other party as "fraud". For example, if one party provides cash amount (limited to same amount of contactless payments, for example 30 GBP in the UK but can be a different value as decided by the system server/Ledger) to the other party but the other party does not confirm the transaction one the NFC communication is completed. Then the one who hand over the cash will flag inside the software application the other party of the transaction as fraud. But reverse is also possible, where the party who should receive the cash confirms the transaction but is not handed over the cash, in which case he can flag the other party as fraud.

In other transaction types, where no cash is involved, like for example payment transfer between say two parties by NFC, or foreign exchange between two parties by NFC, no party to those transactions are be enabled to flag the other party as fraud but instead the system server/Ledger takes on that task in an automated manner, so if the transaction of the paying party (Debtor) cannot be performed towards the receiving party (Creditor) due to insufficient funds, then the sever/Ledger will notify the application software of the wireless device of the Creditor to top-up his account minimum with such amount required to complete such transaction and will block any outgoing funds (be it traditional currencies or crypto currencies) or if the terms and conditions allow the system server/Ledger will foreign exchange from any other available currency on such Creditor user account to cover such transaction and execute it towards the Debtor of such transaction. If any transaction cannot be executed before the validity timeout of a transaction (such time set by the system server/Ledger for example to a week) then such Creditor is flagged as fraud by the system server/server.

When a user account is set as fraud and reaches a threshold of fraud triggers or amount of currency threshold set by the system server/Ledger then that user account is permanently blocked until all its defrauded amount is settled in full and if applicable be reported to the authorities for prosecution.

An account blocked for fraud by the server/Ledger extends to any other account using the same email address, or the same mobile number, or the same name and birth place and birthdate combined as a unique identity.

As a data protection method in this embodiment, the wireless financial system or wireless digital banking system, the use of a UTID makes the transaction fully anonymous between the software application of each wireless device that forms part of a same transaction using the same UTID and the server/Ledger. SO even in the very unlikely event that one or more communications between a software application and the server/ledger would have been intercepted there would be no information that identifies any user but rather and strictly only transaction parameters information. Any and all communications from and to any software application is done by https with payload additionally fully encrypted as standard additional precaution measure. In addition to that, a transaction made between parties confirming such transaction by NFC (near field communication) requires the server to receive the transaction request from each creditor and debtor that is a party to a transaction with the same UTID.

The UTID (Unique transaction identifier) in a different embodiment can be formed as a random generated code but the preferred embodiment to ensure the same code is not generated by any other user in the same wireless financial system or wireless digital banking system is to have one of these formats:

UTID=% email address % world clock ddmmyy % world clock hhmmss % random generated code of n digits %

The character % ("$") or alternatively another special character but not/("/"), is used as a separation character between fields and in the email address all the characters before the @ sign and between the @ sign and the next dot (.) the character % is ignored and not considered as a separation between fields by the server. Any other fields other than the email fields the character % is not used when such UTID is generated.

In another embodiment the email field can be the following information instead of the email address or the following information concatenated behind the email meaning in addition to the email address, like for example the mobile phone number verified in the account in international format, other personal information specific and unique to that user like wireless device identification assigned by the iOS or Android operating system for notifications which is unique to the wireless device of that user.

Many modifications and variations or different embodiments of this present invention are possible in view of the above disclosures, figures, drawings and explanations. Thus, it is to be understood that, within the scope of the appended claims, the invention can be practiced other than as specifically described above. The invention which is intended to be protected should not, however, be construed as limited to the particular forms disclosed, or implementation examples outlined, as these are to be regarded as illustrative rather than restrictive. Variations and changes could be made by those skilled in the art without deviating from the novelty of the invention. Accordingly, the foregoing detailed descriptions and figures should be considered exemplary in nature and not limited to the novelties of the invention as set forth in the claims.

In a different embodiment, the transaction information sent to the system server/Ledger by each party software application of their wireless device that have the same UTID, is for example the following information where each field is separated by for example by the a double percentage character (%%) as follows:

%% UTID %% Creditor or Debtor %% number of parties to this transaction %% type of transaction %% amount Creditor %% currency Creditor %% amount Debtor %% currency Debtor %% WIFI or Bluetooth internet sharing SSID %% WIFI or Bluetooth internet sharing one off use password %%

As an example, a payment transaction on 1 Jun. 2019 at 15 h31:40 sec from user1 of 30 GBP to user 2, where user 1 has internet and can share it with user2 during this transaction in the event user2 has no internet, then the https (JSON) encrypted payload could be this one:

Sent by user1 the follow string encrypted to user2 by NFC:

%% myname@email.com %01062019%153140% E4MVX54129%% Creditor %%2%% Pay mentTransfer %%30%% GBP %% %% %% MYWIFINAME %% MYWIFIpassword27by %%

Sent by user1 the following string encrypted to server/Ledger by internet https/Json:

%% myname@email.com %01062019%153140% E4MVX54129%% Creditor %%2%% Pay mentTransfer %%30%% GBP %% %% %%

Sent by user2 the following string encrypted to server/Ledger by internet https/Json through the WIFI internet shared by user1 wireless device:

%% myname@email.com %01062019%153140% E4MVX54129%% Debtor %%2%% Pay mentTransfer %% %% %%30%% GBP %%

Where a space means an empty field.

A random alphanumerical code of 5 letters (26 different western alphabet a to z) and 5 numbers (10 different numbers, o to 9) such as (E4MVX54129) can create 3610=3, 656,158,440,062,976=3,6 Quintillion=3,656 Billion different combinations.

In the event where the transaction is a foreign exchange (FX) between user 1 and user 2. As an example, an FX transaction on 1 Jun. 2019 at 15 h31:40 sec from user1 of 30 GBP to user 2, and user 2 confirms FX in EUR to be 27 where user 1 has internet and can share it with user2 during this transaction but user2 has his own internet, then the https (JSON) encrypted payload could be this one:

Sent by user1 the following string encrypted to user2 by NFC:

%% myname@email.com %01062019%153140% E4MVX54129%% Creditor %%2%% FX %%30%% GBP %% %% EUR %% MYWIFINAME %% MYWIFIpassword27by %%

User2 responds to user1 with the exchange rate as EURO 27 and user 1 confirms and then user1 software app sends the following string encrypted to server/Ledger by internet https/Json:

%% myname@email.com %01062019%153140% E4MVX54129%% Creditor %%2%% FX %%30%% GBP %%27%% EUR %%

Sent by user2 the following string encrypted to server/Ledger by internet https/Json:

%% myname@email.com %01062019%153140% E4MVX54129%% Debtor %%2%% FX %%30%% GBP %%27%% EUR %%

Concepts

1. A wireless digital financial system, comprising wireless devices (SP1, SP2, SP3, SP4, ... SPn), each wireless device including a respective downloaded software application (app) (SP1.1, SP2.1, SP3.1, SP4.1, ... SPn.1), and wherein:

a) the wireless devices (SP1, SP2, SP3, SP4, ... SPn) are Internet enabled mobile phones, smartphones or tablets, each wireless device (SP1, SP2, SP3, SP4, ... SPn) also including at least one or more different built-in low power—short range—radio transceivers (e.g. NFC for up to 10 cm range, Bluetooth 5.0 or BLE with reduced transmit power to cover meters or less range), wherein each wireless device (SP1, SP2, SP3, SP4, ... SPn) is, automatically upon download of the respective software application (SP1.1, SP2.1, SP3.1, SP4.1, ... SPn.1) into the respective wireless device (SP1, SP2, SP3, SP4, ... SPn), configured to make the software application (SP1.1, SP2.1, SP3.1, SP4.1, ... SPn.1) operable to access the respective wireless device's functions and enables the software application (SP1.1, SP2.1, SP3.1, SP4.1, ... SPn.1) to be operable to communicate with the system server/ledger and with respective other software applications downloaded into any other nearby wireless device (SPn) included in the system within short radio range (e.g. <10 cm, or <1 m or <meters apart); wherein any wireless device (SPn) or (SP1, SP2, SP3, SP4) included in the system is automatically an authorized wireless device of the system upon download of a respective software module (SP1.1, SP2.1, SP3.1, SP4.1, ... SPn.1);

b) wherein each respective software application (app1) (SP1.1) is operable when downloaded into the respective wireless device (SP1), such wireless device 1 (SP1) when in short range proximity (e.g. in case of NFC when closer than 10 cm) communicates with another software application (app2) or (SP2.1), wherein a new transaction can be initiated by the wireless device user 1 of wireless device 1 (SP1) requesting to be credited by interacting manually with the software application (app1) or (SP1.1) of wireless device (SP1), and c) wherein the software application (SP1.1) of the initiating user's wireless device (SP1) auto generates a Unique Transaction Identifier (UTID1) and passes the relevant parameters to the nearby wireless device (SP2) software application (SP2.1) through the short-range radio communication channel between SP1 and SP2, and d) wherein such parameters exchanged are at least the UTID1, amount to be credited, and the currency associated to such amount, and e) wherein once the wireless device 2 receives confirmation of acceptance from the debtor or the user of wireless device 2 (SP2) of such amount (X) in that given currency (Y) to be debited to his account, then automatically software module of user 2 (SP2.1) software application (SP2.1) sends to the system server/ledger at the first next opportunity (e.g. in the event it doesn't have internet connection at that moment) a transaction request with at least the following parameters; UTID1, amount (X), currency (Y), Debtor.1, and user 1 (SP1.1) software application (SP1.1) sends to the system server/ledger at the first next opportunity (e.g. in the event it doesn't have internet connection at that moment) a transaction request with at least the following parameters; UTID1, amount (X), currency (Y), Creditor, Number of Debtors and f) wherein upon receipt by the system server/Ledger of the transactions requests with the same UTID1 from the Creditor the server will execute each individual transaction when it receives the same transaction request per each Debtor.1 to Debtor.n that match the identical UTID1, amount (X), currency (Y).

2. A wireless digital financial system, comprising wireless devices (SP1, SP2, SP3, SP4), each wireless device including a respective downloaded software application (SP1.1, SP2.1, SP3.1, SP4.1), and wherein:

a) the wireless devices (SP1, SP2, SP3, SP4) are Internet enabled mobile phones, smartphones or tablets, each wireless device (SP1, SP2, SP3, SP4, ... SPn) also including at least one or more built-in low power—short range—radio transceivers (e.g. NFC for up to 10 cm range, Bluetooth 5.0 or BLE with reduced transmit power to cover meters or less range), wherein each wireless device (SP1, SP2, SP3, SP4) is, automatically upon download of the respective software application (SP1.1, SP2.1, SP3.1, SP4.1) into the respective wireless device (SP1, SP2, SP3, SP4), configured to make the software application (SP1.1, SP2.1, SP3.1, SP4.1) operable to access wireless device's functions and enables the software application (SP1.1, SP2.1, SP3.1, SP4.1) to be operable to communicate with the system server/ledger and with respective other software applications downloaded into any other nearby wireless device (SPn) included in the system within short radio range (e.g. <10 cm, or <1 m or <meters apart); wherein any wireless device (SPn) or (SP1, SP2, SP3, SP4) included in the system is automatically an authorized wireless device of the system upon download of a respective software module (SP1.1, SP2.1, SP3.1, SP4.1);

b) wherein each respective software application (app1) or (SP1.1) is operable when downloaded into the respective wireless device (SP1), such wireless device 1 (SP1) when in short range proximity (e.g. in case of NFC when closer than 10 cm) communicates with another software application (app2) or (SP2.1), wherein a new transaction can be initiated by the wireless device user 1 of wireless device 1 (SP1) requesting to be credited by interacting manually with the software application (app1) or (SP1.1) of wireless device (SP1), and c) wherein the software application (SP1.1) of the initiating user's wireless device (SP1) auto generates a Unique Transaction Identifier (UTID1) and passes the relevant parameters to the nearby wireless device (SP2) software application (SP2.1) through the short-range radio communication channel between SP1 and SP2, and d) wherein such parameters exchanged are at least the UTID1, amount to be credited or debited, and the currency associated to such amount, and the number of creditors is increased automatically by one each time a user's wireless device of a debtor by short range radio (e.g. <10 cm using NFC) confirms such operations, and e) wherein once wireless device 2 receives confirmation from the debtor or the user of wireless device 2 (SP2) of his acceptance of such amount (X) in that given currency (Y) to be debited to his account, then automatically the software module of user 2 (SP2.1) software application (SP2.1) sends to the system server/ledger at the first next opportunity (e.g. in the event it doesn't have internet connection at that moment) a transaction request with at least the following parameters; UTID1, amount (X), currency (Y), acknowledged by SP1.1 as Debtor.1, and if more debtors confirm on their respective wireless devices, then each debtor user n (SPn.1) software application (SP2.1) sends to the system server/ledger at the first next opportunity (e.g. in the event it doesn't have internet connection at that moment) a transaction request with at least the following parameters; UTID1, amount (X), currency (Y), acknowledged by SP1.1 as Debtor.n, and user 1 (SP1.1) software application (SP1.1) sends to the system server/ledger at the first next opportunity (e.g. in the event it doesn't have internet connection at that moment) a transaction request with at least the following parameters; UTID1, amount (X), currency (Y), Creditor, Number of Debtors (n) and f) wherein upon receipt by the system server/Ledger of the transactions requests with the same UTID1 from the Creditor the server will execute each individual transaction when it receives the same transaction request per each Debtor.1 to Debtor.n that match the identical UTID1, amount (X), currency (Y), as individual transactions; the transactions including execute debiting user 2 with amount X in currency Y, and
execute crediting user 1 with amount X in currency Y, and
execute debiting user n with amount X in currency Y, and
execute crediting user 1 with amount X in currency Y, and
wherein user 1 will have received as debited amount n times amount X in currency Y as n equal credits from n users.

3. A wireless digital financial system of any preceding concept in which the wireless devices (SP1, SP2, SP3, SP4, SPn) when downloading a software application (SP1.1, SP2.1, SP3.1, SP4.1, SPN.1) enables a) the software application (SP1.1) and (SP2.1) of nearby wireless devices (SP1) and (SP2) to detect when closer than 10 cm by establishing that detection when a NFC (near field communication) interaction is detected and deemed to be >10 cm distance when no NFC interaction is detected, and b) when the software application of two wireless devices are deemed within <10 cm from each other, then the corresponding software application (SP1.1, SP2.1, SP3.1, SP4.1, SPN.1) of the corresponding wireless device user of (SP1, SP2, SP3, SP4, SPn) that is the Creditor or the Debtor are allowed by the corresponding software module to initiate a new transaction and the corresponding software application (SP1.1, SP2.1, SP3.1, SP4.1, SPN.1) of the initiating party (Creditor or Debtor) will then generate a new UTID (unique transaction identifier) for that transaction, or c) when the software application of two wireless devices are deemed within more than 10 cm (>10 cm) from each other, then only the corresponding software application (SP1.1, SP2.1, SP3.1, SP4.1, SPN.1) of the corresponding wireless device user of (SP1, SP2, SP3, SP4, SPn) that is the Creditor is allowed by the corresponding software module to initiate a new transaction and the corresponding software application (SP1.1, SP2.1, SP3.1, SP4.1, SPN.1) of the initiating party (Creditor only) will then generate a new UTID (unique transaction identifier) for that transaction.

4. A wireless digital financial system of any preceding concept in which the wireless devices (SP1, SP2, SP3, SP4, SPn) when downloading a software application (SP1.1, SP2.1, SP3.1, SP4.1, SPN.1) enables a) the software application of the initiating party (Creditor) to request a UTID (Unique Transaction Identifier) to the system server/Ledger by the initiating party of a transaction that has established short range communication within less than 10 cm distance between the two wireless devices (by NFC when closer than 10 cm) or b) the software application of the initiating party (Creditor or Debtor) to request a UTID (Unique Transaction Identifier) to the system server/Ledger by the initiating party of a transaction that has established short range communication within more than 10 cm between two initial wireless devices (e.g. by Bluetooth or BLE further than the 10 cm or in other word when outside of NFC range).

5. A wireless digital financial system or method in which the wireless devices (SP1, SP2, SP3, SP4, SPn) software application (SP1.1, SP2.1, SP3.1, SP4.1, SPN.1) when being granted permission by the user of each wireless device, is enabled to extract and processes certain additional location information from the wireless device through the software application (SP1.1, SP2.1, SP3.1, SP4.1, SPN.1) and sends in on non-real time at time-intervals (e.g. daily or weekly); and a) wherein If the internet connection of the wireless device (SP1, SP2, SP3, SP4, SPn) is detected by the software application (SP1.1, SP2.1, SP3.1, SP4.1, SPN.1) to be not with a mobile network (e.g. not through the SIM of the wireless device), meaning it is through a fixed wireless internet through WIFI, WiMAX or similar, then an https ping is sent to a 3rd party global services server main domain and process the re-direct response from such server when re-directing to the in-country server where the software application extracts the country code from such re-direct response and send such country to the system server/Ledger, and b) wherein if connected to a mobile network internet (e.g. through the SIM of the wireless device) (SP1, SP2, SP3, SP4, SPn) is detected by the software application (SP1.1, SP2.1, SP3.1, SP4.1, SPN.1) to be a mobile network (e.g. through the SIM of the wireless device), meaning it is through a mobile network internet through 4G/5G, WCDMA, or similar, then then the Roaming Indication if available in that wireless device is the one stored for that day as being in home country or as in not being in home country, and c) wherein if active and accessible, the physical location country (e.g. obtained by GPS, US based global location or GNSS, European based global location) is extracted and processed so as to extract only the country of such location of the wireless device and send to the system server/Ledger by the software application, where the system server will always prioritize the physical location country if available and ignore any such other country indication, and d) wherein if an active SIM is accessible in the wireless device (SP1, SP2, SP3, SP4, SPn) then the software application (SP1.1, SP2.1, SP3.1, SP4.1, SPN.1) extracts from the SIM the country code and translates that with a look-up table to the actual home country of the SIM mobile network provider of that wireless device user, and e) wherein previous steps a), b), c) and d) are repeated on a daily basis by the software application (SP1.1, SP2.1, SP3.1, SP4.1, SPN.1) of wireless devices (SP1, SP2, SP3, SP4, SPN) at a random time decided by the software application (SP1.1, SP2.1, SP3.1, SP4.1, SPN.1) between a time set by the system server before and after midnight, with a default decided by the software application when such parameter is not set, and f) wherein the system server/ledger will prioritize the country identified as marked from physical location hardware (GPS, GNSS), and if not available then will prioritize the country marked from WIFI ping re-direct country if it complies with this additional check: if country WIFI ping re-direct ping is the SIM home country but the wireless device indicates it is Roaming then the WIFI country is ignored as it assumes a VPN (virtual private network) is used to mask the true country, and if previous do not pass the check or are not available then the Roaming indication is used by the system server to determine if that user of that wireless device was in his home country as he indicated in his account creation, and g) wherein the system server/Leger creates auto-generated alarm triggers to be acted upon by the system administrators or auto generates message(s) to the users or the wireless device that has a mismatch between the country of the SIM home country and the country he provided at account creation or if during statistical interpolation more than 92 days or 183 days, depending if that wireless device was not in his SIM home country or in his reported home country when the account was created.

6. A wireless digital financial system or method of any preceding concept in which a retail cash-register machine, or a vending machine, or a credit card or debit card, or a point of Sale terminal is adapted with a downloaded or built-in software application (SPn.1) and thereby automatically forming part of the wireless communication system to accept cash deposit and/or cash withdrawals machines when interacting with wireless devices (SP1, SP2, SP3, SP4) software app (SP1.1, SP2.1, SP3.1, SP4.1) enabling virtually such adapted devices to be used as virtual ATMs (automated teller machines).

7. A wireless digital financial system or method of any preceding concept in which the wireless devices (SP1, SP2, SP3, SP4, SPn) software application (SP1.1, SP2.1, SP3.1, SP4.1, SPN.1) when nearby or at the time of initiation of a transaction, if one of the wireless devices has internet, then it will automatically share an additional parameter through the short range—low power transceiver, namely a one off random generated password of the hotspot activated by the wireless device with internet (SP1) through software application (SP1.1) to the wireless device with no internet (SP2) through software application (SP2) and to others of that same transaction if they have no internet like wireless device (SPn) through software application (SPn.1), wherein software application (SP2.1 and SPn.1) then automatically connects to the hotspot of wireless device (SP1) using the received password.

8. A wireless digital financial system or method of any preceding concept in which each transaction performed through a software application (SP1, SP2, SP3, SP4, SPn) downloaded into a corresponding wireless device (SP1.1, SP2.1, SP3.1, SP4.1, SPn.1) will only be transferred to the server/Ledger, for execution by the server/Ledger, if confirmed by the corresponding user of each such wireless device (SP1, SP2, SP3, SP4, SPn) by logging into his own corresponding software application (SP1, SP2, SP3, SP4, SPn) account.

9. A wireless digital financial system or method of any preceding concept in which each transaction performed through a software application (SP1.1, SP2.1, SP3.1, SP4.1, SPn.1) downloaded into a corresponding wireless device (SP1, SP2, SP3, SP4, SPn) is between at least 2 parties or users of wireless devices (SP1, SP2, SP3, SP4, SPn) allowing for the following transactions;

cash deposit, by wireless device user (SP3) of software application (SP3.1) giving money in hand to user of wireless device user (SP4) of software application (SP4.1) and by NFC software applications (SP3.1) and (SP4.1) confirm such transfer of the same amount of money in digital money from the server/Ledger account of user (SP4 and SP4.1) as Debtor to the server/Ledger account of user (SP3 and SP3.1) as Creditor, or cash withdrawal, by wireless device user (SP2) of software application (SP2.1) receiving money in hand from user of wireless device user (SP1) of software application (SP1.1) and by NFC software applications (SP2.1) and (SP1.1) confirm such transfer of the same amount of money in digital money from the server/Ledger account of user (SP2 and SP2.1) as Debtor to the server/Ledger account of user (SP1 and SP1.1) as Creditor, or foreign exchange (FX), by wireless device user (SP1) of software application (SP1.1) giving X amount of money in currency Y by initiating a transfer marked as FX to user of wireless device user (SP4) of software application (SP4.1) and by NFC software applications (SP1.1) and (SP4.1) confirm such FX transaction and the on screen transfer shown of the FX amount of FX values as in W amount of money in the FX currency Z digital money from the server/Ledger account of user (SP4 and SP4.1) as Debtor to the server/Ledger account of user (SP1 and SP1.1) and the amount X in currency Y money from the server/Ledger account of user (SP1 and SP1.1) as Debtor to the server/Ledger account of user (SP4 and SP4.1), or payment transfer, by wireless device user (SP3) of software application (SP3.1) initiating a transfer of amount X in currency Y to user of wireless device user (SP4) of software application (SP4.1) and by NFC software applications (SP3.1) and (SP4.1) confirm such transfer of such amount X in currency Y in digital money from the server/Ledger account of user (SP3 and SP3.1) as Debtor to the server/Ledger account of user (SP4 and SP4.1) as Creditor, or payment split, by wireless device user (SP1) of software application (SP1.1) who pays the full amount X in currency Y and splits between n users, by user initiating a new transaction entering amount x, currency y and number to be split (say n=4), then SP1.1 calculates (X/n) and sets number of Debtors as (n−1), whereas by NFC communication the software applications (SP1.1) user first executes amount X/4 with (SP2.1) as Credited to SP1.1 and Debited to SP2.1 by bring wireless devices (SP1) and (SP2) closer than 10 cm from each other, and then after sequentially the same operation until n−1 times in total by NFC software applications (SP1.1) executes with (SP3.1) and then after by NFC software applications (SP1.1) executes with (SP4.1), or cash withdrawal, foreign exchange, payment transfer by a Credit Card or debit card adapted to communicate with the software application (SP1.1, SP2.1, SP3.1, SP4.1, SPn.1) downloaded into a corresponding wireless device (SP1, SP2, SP3, SP4, SPn) through the NFC of the adapted credit or debit card and the NFC of the wireless device (SP1, SP2, SP3, SP4, SPn) to the corresponding software application (SP1.1, SP2.1, SP3.1, SP4.1, SPn.1).

10. A wireless digital financial system or method of any preceding concept in which each transaction performed through a software application (SP1.1, SP2.1, SP3.1, SP4.1, SPn.1) downloaded into a corresponding wireless device (SP1, SP2, SP3, SP4, SPn) is preceded by the software application that identifies the user of any given transaction of the Debtor or Debtors to only allow such interaction with other nearby users or such transaction request to be sent to the system server, only if the Debtor's wireless device has internet access and the software module of the Debtor confirmed prior by exchange with the system server that the Debtor has sufficient funds to execute such Debtor transaction otherwise the software application of each Debtor that forms part of a transaction will not be allowed to communicate such transaction request between Debtor and other nearby users of the wireless digital financial system.

11. A method of operating a wireless digital financial system of any preceding concept, in which the system server/Ledger creates separately to the UTID (Unique transaction identifier) a "Transaction number" (TNR) per each user account, wherein starting such TNR from 1 at user account creation and which the server/Ledger increments by one at each executed transaction by the server/Ledger for that user account (credit and debit), and allows access to all those transactions in each separate user account as follows:

in a first step by the user of such account, doing a login into his corresponding user account, or only if the user activated an additional verification setting, then;

in a second step an additional verification auto activated by the server on user settings request by the server/Ledger sending one of the following additional verification methods:

sending an SMS, notification to the Software Application or an email to the user with a random code, valid for a limit time (tenths of minutes validity) that the user needs to fill in the software application before he gets full access to his account.

The invention claimed is:

1. A wireless digital financial system, comprising a system server-ledger, wireless devices, each wireless device including a respective downloaded software application, and wherein:

a) the wireless devices are Internet enabled mobile phones, smartphones or tablets, each wireless device also including at least one or more different built-in low power short range radio transceivers, wherein each wireless device is, automatically upon download of the respective software application into the respective wireless device, configured to make the software application operable to access the respective wireless device's functions and enables the software application to be operable to communicate with the system server-ledger and with respective other software applications downloaded into any other nearby wireless device included in the system within short radio range; wherein any wireless device included in the system is automatically an authorized wireless device of the system upon download of a respective software module;

b) wherein each respective software application is operable when downloaded into the respective wireless device, such respective wireless device when in short range proximity is configured to communicate with another software application in another respective wireless device, wherein a new transaction can be initiated by the respective wireless device in response to receiving a manual instructions from a user of the respective wireless device requesting to be credited using the software application of the respective wireless device, and c) wherein, in response, the software application of the respective wireless device auto generates a Unique Transaction Identifier (UTID1) and passes the relevant parameters to the other respective wireless device software application through a short-range radio communication channel between the respective wireless device and the other respective wireless device, and d) wherein the relevant parameters are at least the UTID1, an amount to be credited, and a currency associated with the amount to be credited, and e) wherein in response to the other respective wireless device receiving confirmation of acceptance from the user of the other respective wireless device of the amount in the currency to be debited to his account, then automatically the software application of the other respective wireless device sends to the system server-ledger at the next opportunity a transaction request with at least the following parameters; UTID1, the amount, the currency, the identity of the user of the other respective wireless device, and the software application of the respective wireless device sends to the system server-ledger at the next opportunity a transaction request with at least the following parameters; UTID1, the amount, the currency, the identity of the user of the respective wireless device, a Number of Debtors and f) wherein upon receipt by the system server-ledger of the transactions requests with the same UTID1 from the user of the respective wireless device, the server-ledger is configured to execute each individual transaction when it receives the same transaction request per each user of other respective wireless devices that match the UTID1, the amount, and the currency;

wherein if the respective wireless device and the other respective wireless device are near to each other, at the time of initiation of a transaction, if one of the respective wireless device and the other respective wireless device has an internet connection and the other wireless device does not have an internet connection, then the software application of the wireless device with the internet connection is configured to automatically share an additional parameter through the short range low power transceiver, namely a one off random generated password of the hotspot activated by the wireless device with the internet connection through its software application, to the wireless device with no internet connection, through its software application, and to any other wireless devices participating in the same transaction if they have no internet connection, through their respective software applications, wherein the software applications of the wireless devices without internet connection are configured to then automatically connect to the hotspot of the wireless device with the internet connection, using the received password.

2. The wireless digital financial system of claim 1, in which a) the software applications of nearby wireless devices are configured to detect when the nearby wireless devices are closer than 10 cm by establishing that detection when a NFC (near field communication) interaction is detected, and are configured to detect when the nearby wireless devices are >10 cm distance apart when no NFC interaction is detected, and b) when the software application of two wireless devices are detected to be <10 cm from each other, then the corresponding software application of the corresponding wireless device is allowed to initiate a new transaction and the corresponding software application of the initiating party who may be a Creditor or a Debtor then generates a new unique transaction identifier (UTID) for that transaction, or c) when the software application of two wireless devices are detected to be more than 10 cm from each other, then only the corresponding software application of the corresponding wireless device user that is the Creditor is allowed to initiate a new transaction and the corresponding software application of the initiating party, Creditor, is configured to then generate a new UTID for that transaction.

3. The wireless digital financial system of claim 1, in which
   a) the software application of the initiating party, which is the Creditor, is configured to request a unique transaction identifier (UTID) to the system server-ledger by the initiating party of a transaction that has established short range communication within less than 10 cm distance between the two wireless devices by NFC or
   b) the software application of the initiating party, which may be a Creditor or a Debtor is configured to request a UTID to the system server-ledger by the initiating party of a transaction that has established short range communication in which a distance of more than 10 cm between two wireless devices has been detected.

4. The wireless digital financial system of claim 1, the system including a retail cash-register machine, or a vending machine, or a credit card or debit card, or a point of Sale terminal, in which the retail cash-register machine, or the vending machine, or the credit card or debit card, or the point of Sale terminal is adapted with a downloaded or built-in software application to automatically form part of the wireless communication system to accept cash deposit and/or cash withdrawals machines when interacting with wireless devices software applications enabling virtually such adapted devices to be used as virtual automated teller machines (ATMs).

5. The wireless digital financial system of claim 1, in which each transaction performed through a software application downloaded into a corresponding wireless device is only transferred to the server-ledger, for execution by the server-ledger, if confirmed by the corresponding user of each such wireless device by logging into his own corresponding software application account.

6. The wireless digital financial system of claim 1, in which each transaction performed through a software application downloaded into a corresponding wireless device is between at least two parties or users of wireless devices allowing for the following transactions;
   cash deposit, by a first wireless device user of a first software application giving money in hand to a second wireless device user of a second software application and by NFC, the first and second software applications confirm such transfer of the same amount of money in digital money from the server-ledger account of the second user as Debtor to the server-ledger account of the first user as Creditor, or
   cash withdrawal, by a second wireless device user of a second software application receiving money in hand from a first wireless device user of a first software application and by NFC, the first and the second software applications confirm such transfer of the same amount of money in digital money from the server-ledger account of the second user as Debtor to the server-ledger account of the first user as Creditor, or
   foreign exchange (FX), by a first wireless device user of software application giving X amount of money in currency Y by initiating a transfer marked as FX to a second wireless device user of a second software application and by NFC, the first and the second software applications confirm such FX transaction and the on screen transfer shown of the FX amount of FX values as in W amount of money in the FX currency Z digital money from the server-ledger account of the second user as Debtor to the server-ledger account of the first user and the amount X in currency Y money from the server-ledger account of the first user as Debtor to the server-ledger account of the second user, or
   payment transfer, by a first wireless device user of a first software application initiating a transfer of amount X in currency Y to a second wireless device user of a second software application and by NFC, the first and the second software applications confirm such transfer of such amount X in currency Y in digital money from the server-ledger account of the first user as Debtor to the server-ledger account of the second user as Creditor, or
   payment split, by a first wireless device user of a first software application who pays the full amount X in currency Y and splits between n users, by the first user initiating a new transaction entering amount x, currency y and number to be split, then the first software application calculates X/n and sets number of Debtors as n−1, wherein by NFC communication the first software application user first executes amount X/n with a second software application as Credited to the first software application and Debited to the second software application by bringing the first and the second wireless devices closer than 10 cm from each other, and then after sequentially the same operation until n−1 times in total by NFC the first software application executes with respective other software applications, or
   cash withdrawal, foreign exchange, payment transfer by a Credit Card or debit card adapted to communicate with a respective software application downloaded into a corresponding respective wireless device using the NFC of the adapted credit or debit card and the NFC of the respective wireless device including the corresponding respective software application.

7. The wireless digital financial system of claim 1, in which each transaction performed through a respective software application downloaded into a corresponding respective wireless device is preceded by the respective software application identifying the user of any given transaction who is the Debtor or Debtors and only allowing such interaction with other nearby users or such transaction request to be sent to the system server-ledger, only if the Debtor's wireless device has internet access and the software module of the Debtor confirmed by prior exchange with the system server-ledger that the Debtor has sufficient funds to execute such Debtor transaction otherwise the software application of each Debtor that forms part of a transaction is not allowed to communicate such transaction request between Debtor and other nearby users of the wireless digital financial system.

8. The system of claim 1, wherein the at least one or more different built-in low power short range radio transceivers include near-field communication (NFC) for up to 10 cm range, or Bluetooth 5.0 or Bluetooth Low Energy (BLE) with reduced transmit power to cover between 1 and 10 meters indoor and between 1 to 50 meters outdoor.

9. The system of claim 1, wherein the nearby wireless device included in the system within short radio range is within a range of <10 cm, or <1 m, or <10 meters, or <50 meters.

* * * * *